United States Patent
Nakayama et al.

(10) Patent No.: US 8,212,426 B2
(45) Date of Patent: Jul. 3, 2012

(54) BICYCLE ELECTRICAL WIRING UNIT

(75) Inventors: Kenji Nakayama, Osaka (JP); Kazuhiro Fujii, Osaka (JP)

(73) Assignee: Shimano Inc., Osaka (JP)

( * ) Notice: Subject to any disclaimer, the term of this patent is extended or adjusted under 35 U.S.C. 154(b) by 251 days.

(21) Appl. No.: 12/106,611

(22) Filed: Apr. 21, 2008

(65) Prior Publication Data

US 2009/0261652 A1 Oct. 22, 2009

(51) Int. Cl.
*H01B 11/00* (2006.01)

(52) U.S. Cl. ....................................................... 307/147

(58) Field of Classification Search .................... 307/147
See application file for complete search history.

(56) References Cited

U.S. PATENT DOCUMENTS

| | | | |
|---|---|---|---|
| 4,747,791 A * | 5/1988 | Nishio | 439/638 |
| 4,846,343 A * | 7/1989 | Rupert | 206/303 |
| 4,923,411 A * | 5/1990 | Hayashi et al. | 439/540.1 |
| 4,956,748 A * | 9/1990 | Yamamoto et al. | 361/730 |
| 5,358,451 A | 10/1994 | Lacombe et al. | |
| 5,501,605 A * | 3/1996 | Ozaki et al. | 439/34 |
| 5,762,281 A * | 6/1998 | Foley | 242/376 |
| 5,772,152 A * | 6/1998 | Maldonado | 242/597 |
| 5,888,088 A * | 3/1999 | Kobayashi et al. | 439/404 |
| 5,915,640 A * | 6/1999 | Wagter et al. | 242/388.1 |
| 6,065,708 A * | 5/2000 | Matsubara | 242/388.1 |
| 6,082,656 A * | 7/2000 | Thornton | 242/385.4 |
| 6,204,752 B1 * | 3/2001 | Kishimoto | 340/432 |
| 6,220,874 B1 * | 4/2001 | Kurata et al. | 439/76.2 |
| 6,392,148 B1 * | 5/2002 | Ueno et al. | 174/72 A |
| 6,447,325 B1 * | 9/2002 | Yamane et al. | 439/404 |
| 6,501,245 B2 * | 12/2002 | Okuda | 320/112 |
| 6,523,772 B2 | 2/2003 | Ueno | |
| 6,725,978 B2 * | 4/2004 | Karpowich | 188/20 |
| 6,835,089 B2 * | 12/2004 | Hayes et al. | 439/404 |
| 6,886,844 B2 * | 5/2005 | Ritchey | 280/278 |
| 7,243,937 B2 * | 7/2007 | Ishikawa | 280/288.4 |
| 7,481,131 B2 * | 1/2009 | Weiss | 74/501.5 R |
| 7,533,867 B1 * | 5/2009 | Chiang | 254/231 |
| 7,628,094 B2 * | 12/2009 | Owyang | 74/500.5 |
| 7,779,724 B2 * | 8/2010 | Fujii | 74/551.8 |
| 2007/0099681 A1 * | 5/2007 | Kielland | 455/575.1 |

FOREIGN PATENT DOCUMENTS

| | | |
|---|---|---|
| EP | 1 211 755 A2 | 6/2002 |
| EP | 1 394 031 A2 | 3/2004 |
| FR | 2 853 458 A1 | 10/2004 |
| WO | WO-02/13316 A1 | 2/2002 |

* cited by examiner

*Primary Examiner* — Adi Amrany

(74) *Attorney, Agent, or Firm* — Global IP Counselors, LLP

(57) ABSTRACT

A bicycle electrical wiring unit is provided with a junction housing, a wiring junction and a cable winding structure. The wiring junction is mounted to the junction housing for connecting at least two electrical cables. The cable winding structure is disposed on the junction housing with the cable winding structure including at least one electrical cable holder for selectively retaining different lengths of an intermediate section of a first electrical cable of the electrical cables to the junction housing.

16 Claims, 11 Drawing Sheets

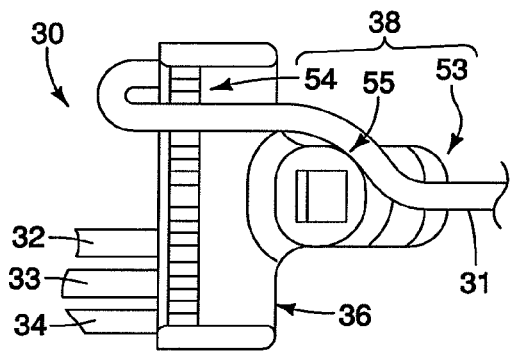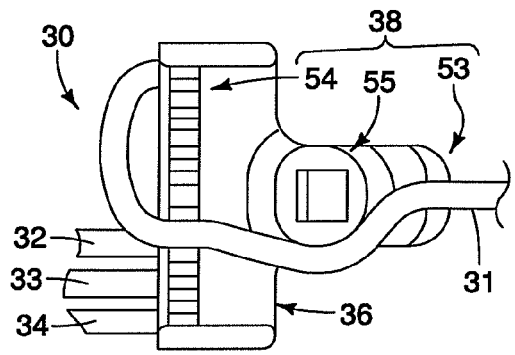
FIG. 14  FIG. 15
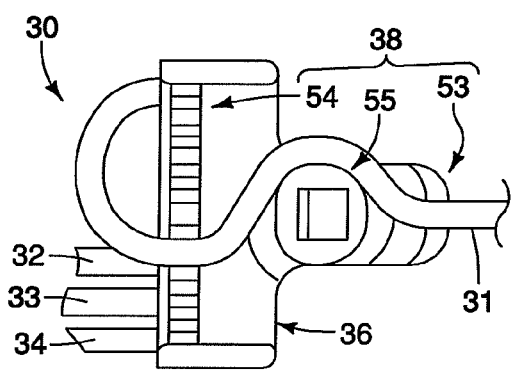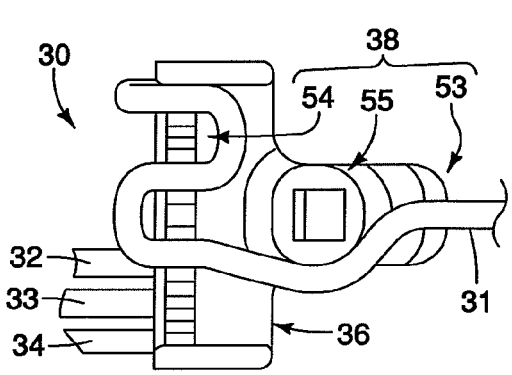
FIG. 16  FIG. 17
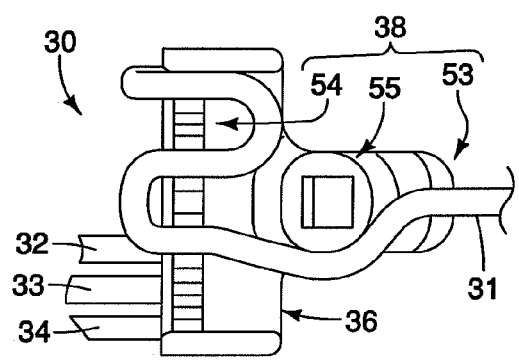
FIG. 18

BICYCLE ELECTRICAL WIRING UNIT

BACKGROUND OF THE INVENTION

1. Field of the Invention

This invention generally relates to a bicycle electrical wiring unit. More specifically, the present invention relates to a bicycle electrical wiring unit which provides a junction between bicycle components such as components of an electrically controlled shifting system.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Specifically, in recent years, bicycles have been provided with electric devices to improve rider efficiency and/or component control. For example, cycle computer systems including a main unit, one or more sensors, one or more control switches, and cords (wires) for electrical communication between the various parts have been utilized on bicycles in recent years to monitor and/or control various functions.

Typically, the various parts of these electric systems are connected by a network of electrical cords (cables) or electrical wires, which are designed to run along portions of the frame of the bicycle. Bicycle frames typically are constructed in a variety of sizes to accommodate riders of different heights. Moreover, bicycle frames are typically designed with a specific geometry for a specific riding situation. For example, bicycles frames can be designed for road-type riding, off-road riding, city or commuter type riding, or downhill riding. Thus, the cords (cables) of electric systems are typically designed to be sufficiently long so the electric device can be used on a variety of bicycle frame sizes and/or frame types.

When these electric systems are utilized on certain bicycle frames such as small bicycle frames, there can be excess cords (cables) extending between the various parts of the electric system. Typically, excess cords (cables) are wrapped around the bicycle frame or component control cables to take-up the slack or excess cord between parts of the electric system. Also, adhesive strips or plastic ties are sometimes utilized to retain or secure the cords (cables) to the frame. These adhesive strips and plastic ties can be cumbersome. Winding the cords around the bicycle frame or control cables can also be cumbersome. These prior systems and mounting methods can create difficulty in installing certain parts of these electric systems on the bicycle. Moreover, it can be difficult to remove or reduce the slack in the cords (cables) during installation of these electric systems. Slack in the cords (cables) can allow the cords (cables) to catch on obstructions such as brush in off-road riding, the cyclist's clothing, etc. Finally, these prior electric systems can have an unattractive appearance when installed on certain bicycle frames.

To overcome these concerns, a cord retainer was proposed to be added to a shifter in U.S. Pat. No. 6,523,722. While this cord retainer works well, this cord retainer requires the excess cord to be wound up on a spool to take up the slack at each of the shifters, and requires the cord retainer on the shifters.

In view of the above, it will be apparent to those skilled in the art from this disclosure that there exists a need for an improved bicycle electrical wiring unit. This invention addresses this need in the art as well as other needs, which will become apparent to those skilled in the art from this disclosure.

SUMMARY OF THE INVENTION

One object of the present invention is to provide a bicycle electrical wiring unit which provides a junction between bicycle components and in which a cable winding structure disposed for selectively retaining different lengths of an electrical cable.

The foregoing objects can basically be attained by providing a bicycle electrical wiring unit that basically comprises a junction housing, a wiring junction and a cable winding structure. The wiring junction is mounted to the junction housing for connecting at least two electrical cables. The cable winding structure is disposed on the junction housing with the cable winding structure including at least one electrical cable holder for selectively retaining different lengths of an intermediate section of a first electrical cable of the electrical cables to the junction housing.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 14 is a top plan view of the bicycle electrical wiring unit illustrated in FIGS. 6 to 10 with the main shift control cable retained in a first position;

FIG. 15 is a top plan view of the bicycle electrical wiring unit illustrated in FIGS. 6 to 10 with the main shift control cable retained in a second position;

FIG. 16 is a top plan view of the bicycle electrical wiring unit illustrated in FIGS. 6 to 10 with the main shift control cable retained in a third position;

FIG. 17 is a top plan view of the bicycle electrical wiring unit illustrated in FIGS. 6 to 10 with the main shift control cable retained in a fourth position;

FIG. 18 is a top plan view of the bicycle electrical wiring unit illustrated in FIGS. 6 to 10 with the main shift control cable retained in a fifth position;

DETAILED DESCRIPTION OF THE PREFERRED EMBODIMENTS

Figure 1:
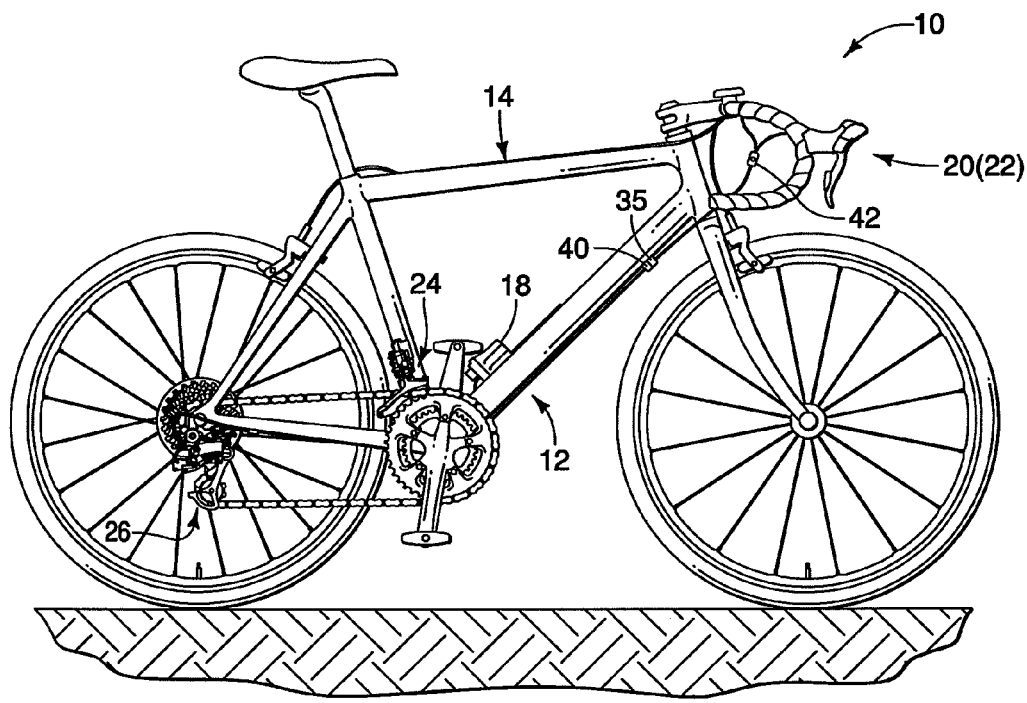
FIG. 1 is a side elevational view of a bicycle having an electrically controlled shifting system in which a bicycle electric wiring harness including a bicycle electrical wiring unit is mounted to a bicycle frame in accordance with one preferred embodiment.
Figure 2:
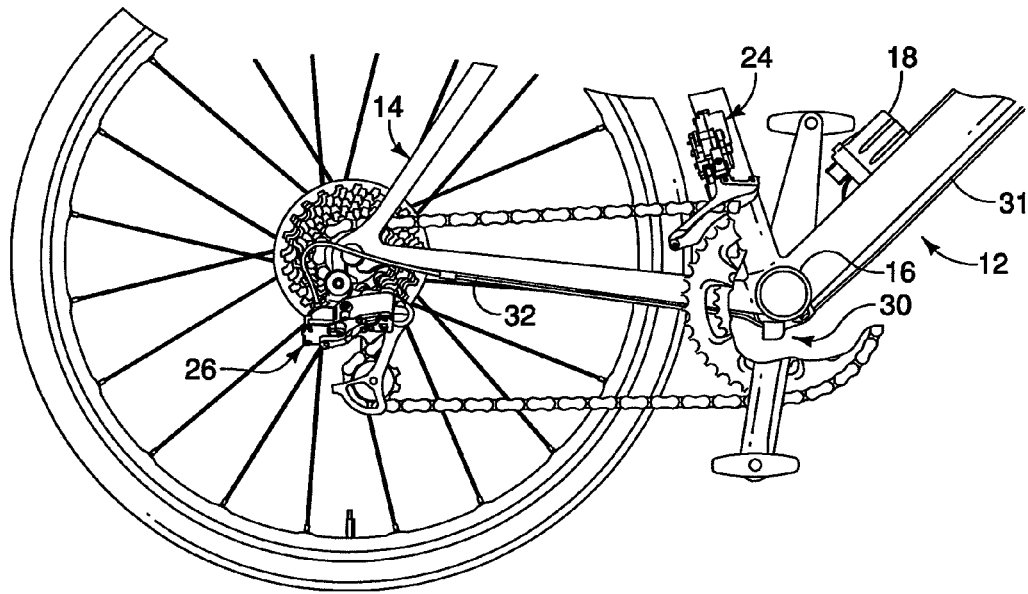
FIG. 2 is a partial, enlarged side elevational view of the bicycle illustrated in FIG. 1 with part of the drive train broken away to show the bicycle electrical wiring unit.
Figure 3:
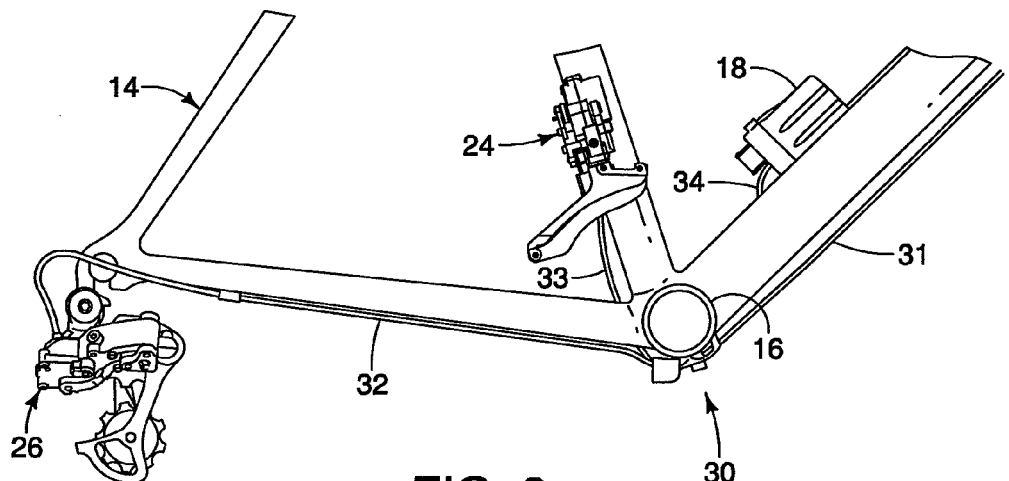
FIG. 3 is a partial, enlarged side elevational view of the bicycle frame and the bicycle electric wiring harness illustrated in FIGS. 2 and 3.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1 to 4, a bicycle 10 is illustrated that is equipped with an electrically controlled shifting system in which a bicycle electric wiring harness 12 is utilized in accordance with one preferred embodiment. The bicycle 10 has a bicycle frame 14 to which the bicycle electric wiring harness 12 is secured. The bicycle electric wiring harness 12 is configured such that the bicycle components of the electrically controlled shifting system can be detached from the bicycle frame 14, while the bicycle electric wiring harness 12 remains attached to the bicycle frame 14.

In the illustrated embodiment, the electrically controlled shifting system basically includes a power source in the form of a bicycle battery unit 18, a pair of electric shifters 20 and 22, a front motorized derailleur 24, and a rear motorized derailleur 26. Alternatively, the power source can be a generator instead of a battery. The bicycle components 18, 20, 22, 24 and 26 are interconnected by the bicycle electric wiring harness 12.

The electrically controlled shifting system is basically conventional, except for the use of the bicycle electric wiring harness 12 to interconnect the bicycle components 18, 20, 22, 24 and 26. For example, in the electrically controlled shifting system of the illustrated embodiment, the electric shifters 20 and 22 electronically control the motorized derailleurs 24 and 26 to change the position of a chain relative to front and rear chain sprockets of the bicycle 10 in a conventional manner. Specifically, control signals from the electric shifters 20 and 22 are transmitted to electric motor units (not shown) in each of the motorized derailleurs 24 and 26 such that a chain guide moves the chain in a conventional manner to the selected chain sprocket. The bicycle battery unit 18 supplies electrical power to at least motor units (not shown) of the motorized derailleurs 24 and 26 for moving the chain. Since electric shifters, motorized derailleurs and power sources such as batteries and generators are well know in the bicycle art, the bicycle battery unit 18, the electric shifters 20 and 22, the motorized derailleurs 24 and 26 will not be discussed or illustrated in detail herein.

Figure 4:
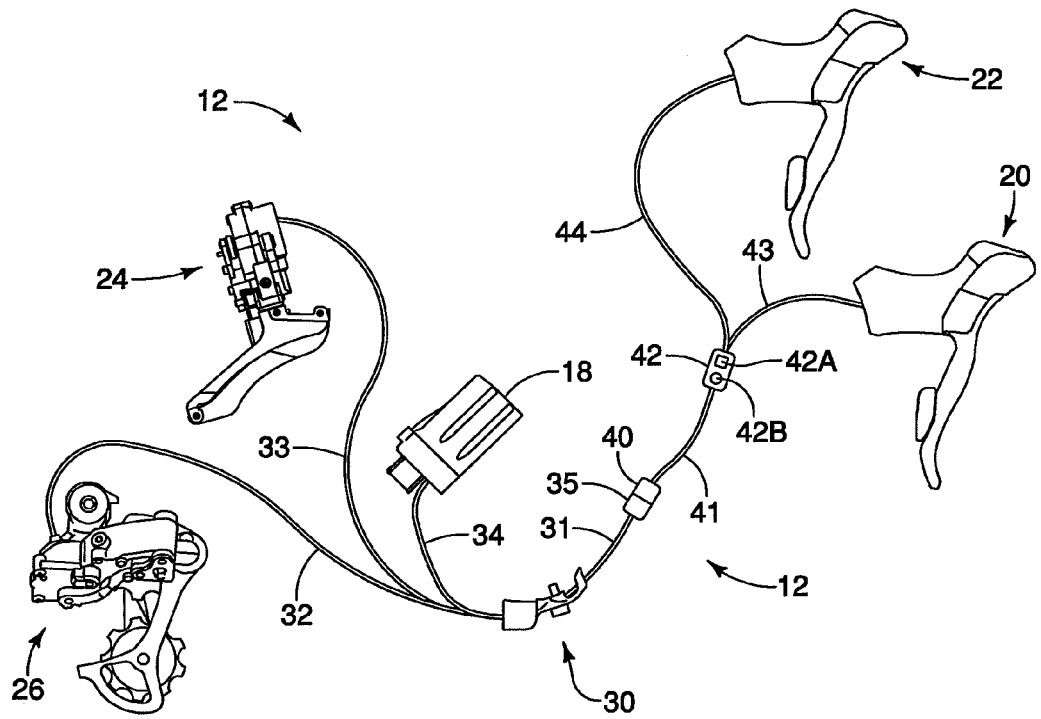
FIG. 4 is a simplified side elevational view of the bicycle electric wiring harness coupled to the components of the electrically controlled shifting system illustrated in FIGS. 1 to 3.
Figure 5:
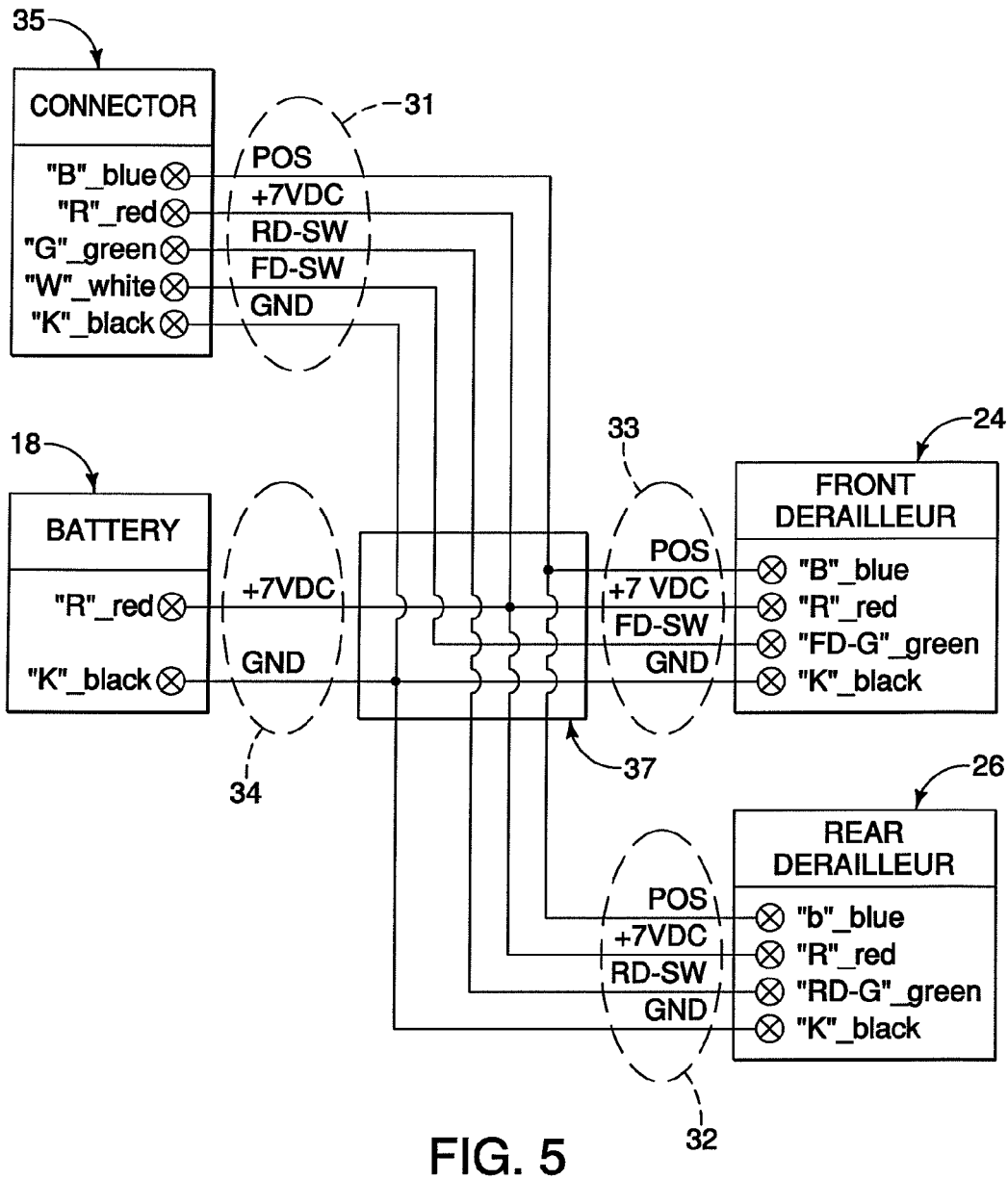
FIG. 5 is a wiring schematic diagram of the view of the bicycle electric wiring harness coupled to the components of the electrically controlled shifting system illustrated in FIGS. 1 to 4.

As best seen in FIG. 4, the bicycle electric wiring harness 12 has a first wiring part that basically includes an electrical wiring unit 30, an electrical main shift control cable 31, an electrical rear derailleur control cable 32, an electrical front derailleur cable 33, an electrical power source cable 34, and a primary shift control connector 35. The electrical wiring unit 30 includes a junction housing 36, a wiring junction 37, a cable winding structure 38 and an end cap 39. The electrical cables 31 to 34 are each electrically connected to the wiring junction 37 as seen in FIG. 5. In addition to this first wiring part, the bicycle electric wiring harness 12 preferably further includes has a second wiring part that basically includes a secondary shift control connector 40, a secondary main shift control cable 41, a secondary wiring junction 42, a first electrical shift (rear derailleur) cable 43 and a second electrical shift (front derailleur) cable 44. The primary and the secondary shift control connectors 35 and 40 are configured and arranged to be electrically connected together such that first and second wiring parts of the bicycle electric wiring harness 12 are electrically connected together. The primary and the secondary shift control connectors 35 and 40 are conventional mating electrical connectors, and thus, they will not be discussed and/or illustrated in detail herein. The secondary wiring junction 42 includes a printed circuit board (not shown) with a rear derailleur mode adjusting switch 42A and a battery indicator light 42B. The printed circuit board of the secondary wiring junction 42 has the electrical conductors of the electrical cables 41, 43 and 44 connected thereto for passing the control signals from the rear derailleur mode adjusting switch 42A and the electrical cables 43 and 44 to the electrical cable 41.

The electrical cables 31 to 34, 41, 43 and 44 are conventional electrical cables or cords that include a plurality of individually insulated electrical conductors disposed in an outer insulating sheath. The insulated electrical conductors of the electrical cables 31 to 34 and their connections to the bicycle components 18, 24 and 26, the primary shift control connector 35 and the wiring junction 37 are illustrated in FIG. 5. Thus, the wiring junction 37 is mounted to the junction housing 36 for operatively connecting the electrical conductors of the electrical cables 31 to 34. In the illustrated embodiment, the wiring junction 37 includes a printed circuit board in which the electrical conductors of the electrical cables 31 to 34 as illustrated in FIG. 5.

Turning now to FIGS. 6 to 13, the construction of the electrical wiring unit 30 will be discussed in more detail.

Figure 12:
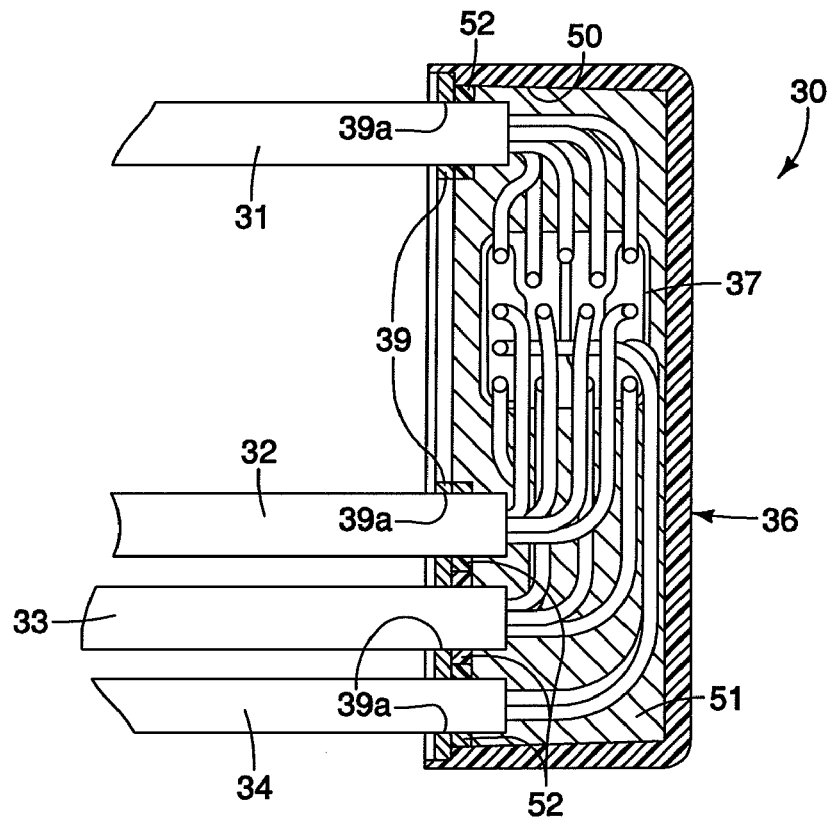
FIG. 12 is a cross-sectional view of the bicycle electrical wiring unit illustrated in FIGS. 6 to 10 as seen along the line 12-12 in FIG. 7.
Figure 13:
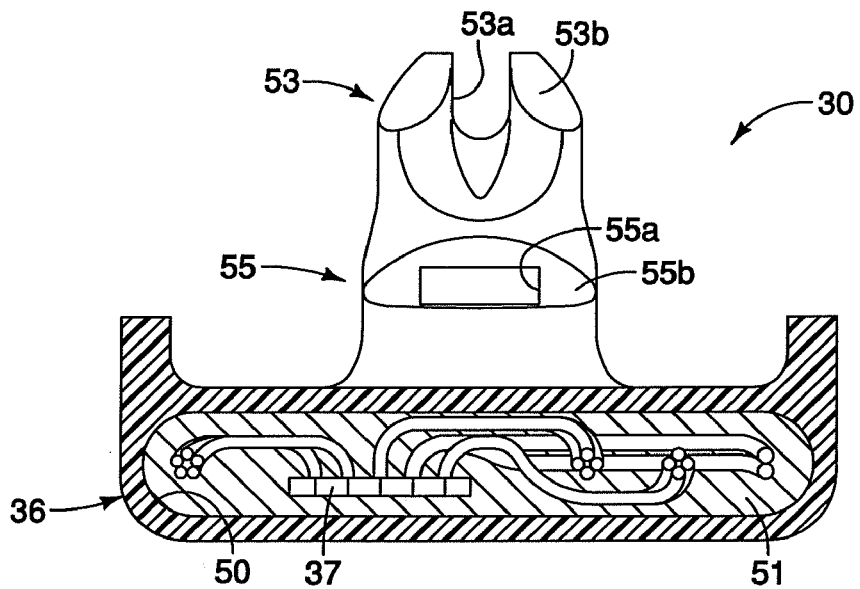
FIG. 13 is a cross-sectional view of the bicycle electrical wiring unit illustrated in FIGS. 6 to 10 as seen along the line 13-13 in FIG. 7.

The junction housing 36 is preferably formed of a hard rigid plastic material and houses the wiring junction 37. In particular, the junction housing 36 has a housing recess 50 with the wiring junction 37 disposed in the housing recess 50. In the illustrated embodiment, the wiring junction 37 is retained in the housing recess 50 by filling the housing recess 50 with an electrical potting material 51 as seen in FIGS. 12 and 13. Of course, it will be apparent to those skilled in the art from this disclosure that the wiring junction 37 can be bonded or secured to the junction housing 36 in other ways. The end cap 39 at least partially closes the housing recess 50.

In the illustrated embodiment, the end cap 39 is made of the same material as the junction housing 36 and bonded to the junction housing 36 by an adhesive. Also in the illustrated embodiment, the end cap 39 is made of two pieces, but it could be a single piece if needed and/or desired. In any event, the end cap 39 is disposed on the junction housing 36 with the end cap 39 including four cable openings 39a for receiving an end section of the electrical cables 31 to 34. To aid in retaining the electrical cables 31 to 34 to the end cap 39, a stop ring 52 is disposed on the end section of the electrical cables 31 to 34 inside the housing recess 50 of the junction housing 36 as seen in FIG. 12.

In the illustrated embodiment, the junction housing 36 and the cable winding structure 38 are preferably integrally formed together as a one-piece, unitary member. However, it will be apparent to those skilled in the art from this disclosure that the junction housing 36 and the cable winding structure 38 can be constructed of several pieces that are connected together to form an integrated unit as needed and/or desired. In either case, the cable winding structure 38 is disposed on the junction housing 36. The cable winding structure 38 is configured and arranged on the junction housing 36 such that the cable winding structure 38 provides different cable paths for selectively retaining different lengths (selected amount) of an intermediate section of the electrical main shift control cable 31 to the junction housing 36.

Figure 6:
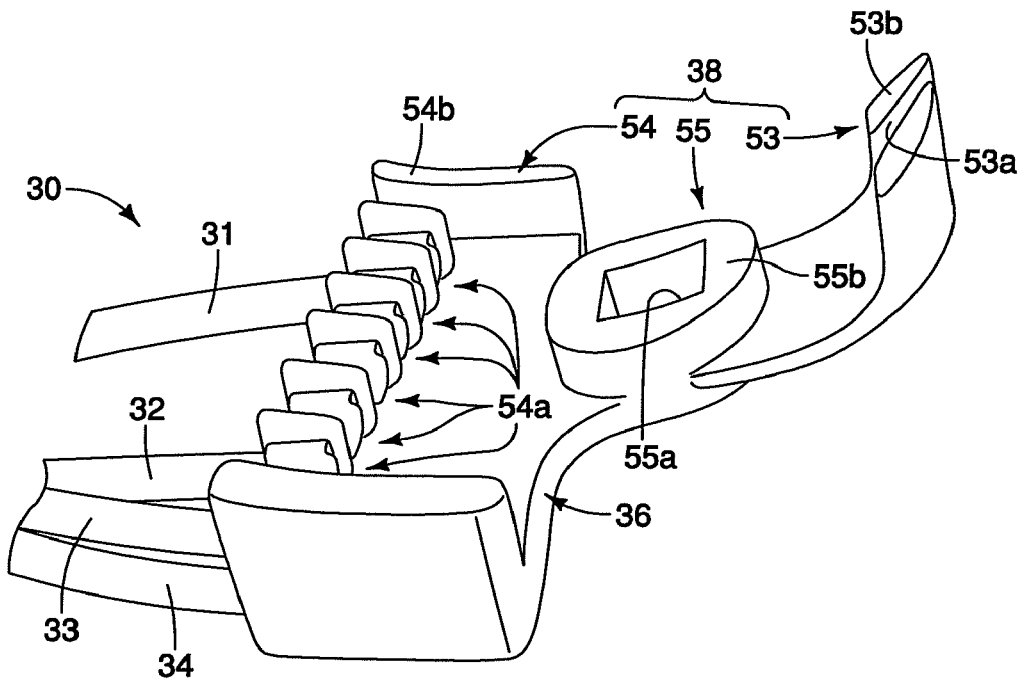
FIG. 6 is a top side perspective view of the bicycle electrical wiring unit illustrated in FIGS. 1 to 5.
Figure 7:
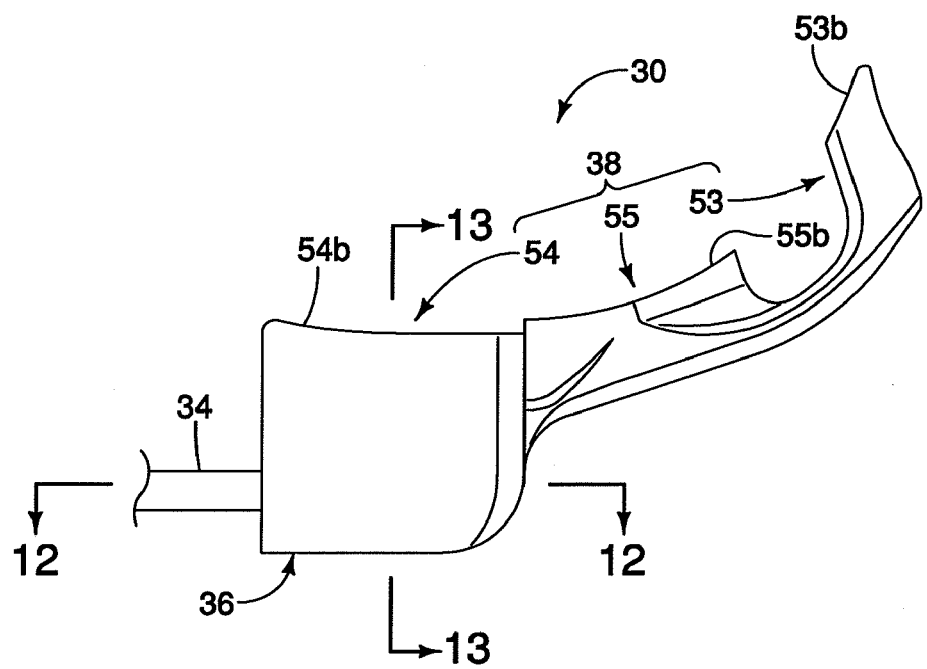
FIG. 7 is a side elevational view of the bicycle electrical wiring unit illustrated in FIG. 6.
Figure 8:
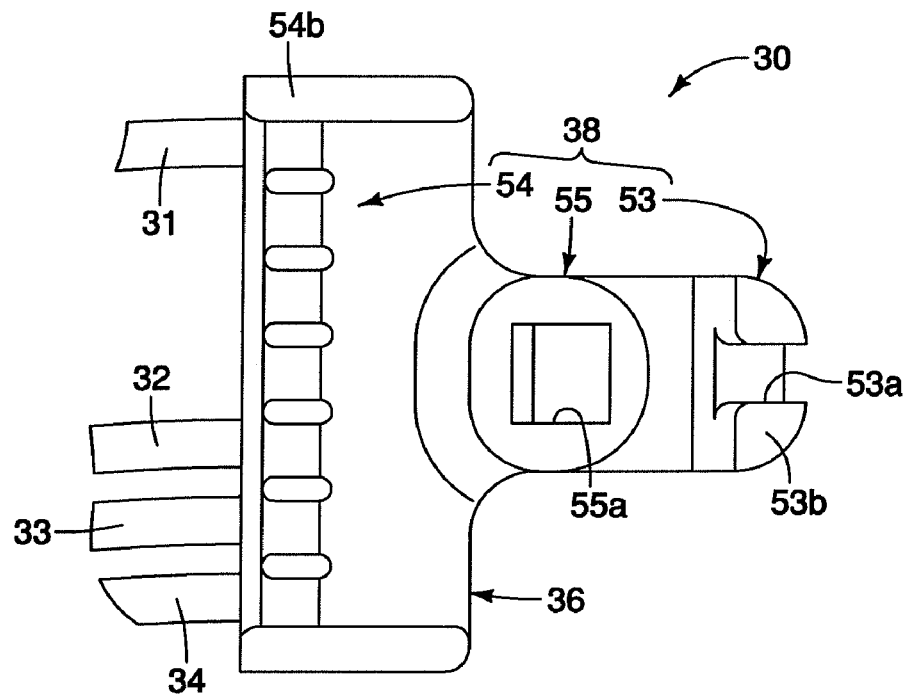
FIG. 8 is a top plan view of the bicycle electrical wiring unit illustrated in FIGS. 6 and 7.
Figure 9:
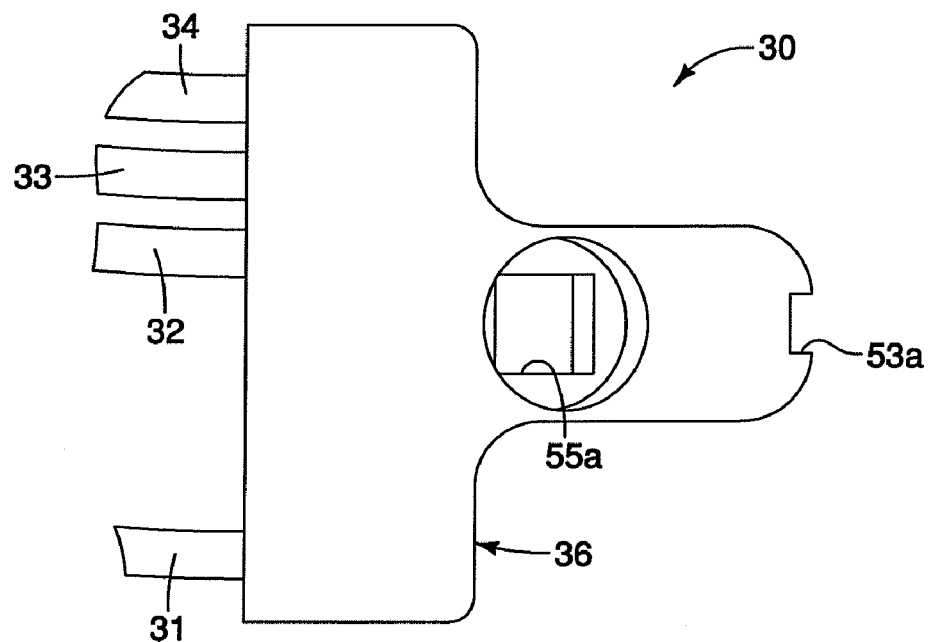
FIG. 9 is a bottom plan view of the bicycle electrical wiring unit illustrated in FIGS. 6 to 8.
Figure 10:
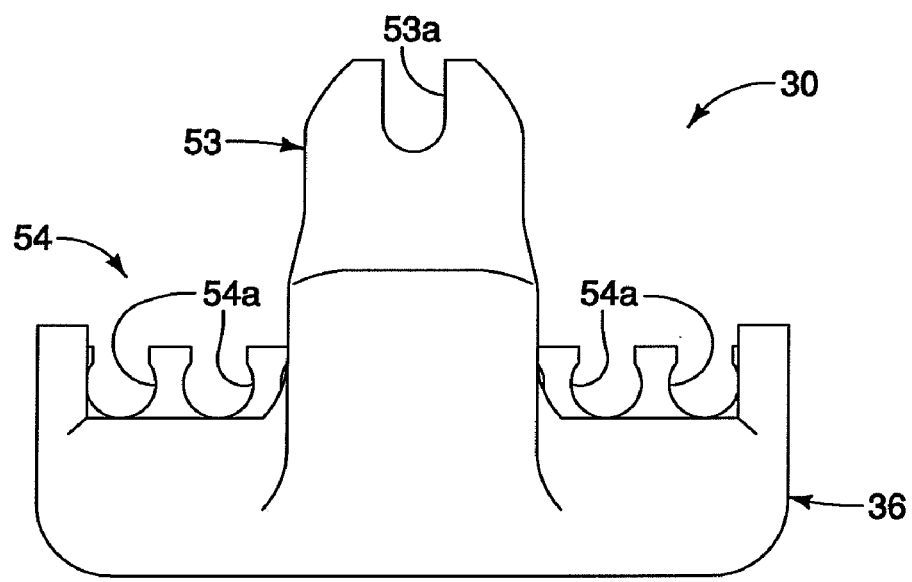
FIG. 10 is a front end elevational view of the bicycle electrical wiring unit illustrated in FIGS. 6 to 9.
Figure 11:
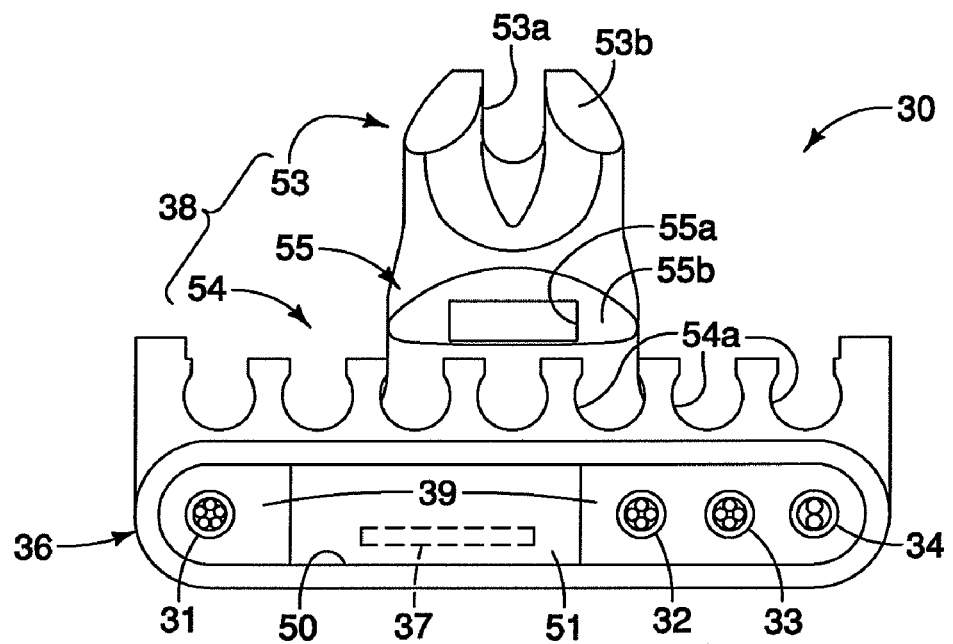
FIG. 11 is a rear end elevational view of the bicycle electrical wiring unit illustrated in FIGS. 6 to 10.

As best seen in FIGS. 6 and 8, in the illustrated embodiment, the cable winding structure 38 basically includes a primary cable holder 53, a plurality of the secondary cable holders 54 and a cable engagement projection 55 disposed between the primary cable holder 53 and the secondary cable holders 54. The primary cable holder 53 has a cable retaining slot 53a for selectively retaining the electrical main shift control cable 31 to the junction housing 36. Similarly, each of the secondary cable holders 54 has a cable retaining slot 54a for selectively retaining the electrical main shift control cable 31 to the junction housing 36. The primary and secondary cable holders 53 and 54 are dimensioned to frictionally retain the electrical main shift control cable 31 to the junction housing 36. In particular, the cable retaining slot 53a has a transverse width that is slightly smaller than the transverse width of the electrical main shift control cable 31 such that the electrical main shift control cable 31 is slightly compressed when inserted into the cable retaining slots 53a. Similarly, each of the cable retaining slots 54a has a transverse width that is slightly smaller than the transverse width of the electrical main shift control cable 31 such that the electrical main shift control cable 31 is slightly compressed when inserted into the cable retaining slots 54a. More preferably, the cable retaining slots 54a has a curved surface that extends more than 180 degrees to retain the electrical main shift control cable 31 to the junction housing 36.

In the illustrated embodiment, the cable engagement projection 55 includes a fastener hole 55a for receiving a bolt that is threaded into a threaded hole formed in the bottom bracket tube of the bicycle frame 14. Thus, the electrical wiring unit 30 is fixedly mounted to the bottom bracket tube of the bicycle frame 14. Optionally, the electrical cables 31 to 34, 41, 43 and 44 are attached to the bicycle frame 14 by cable ties as needed and/or desired.

The primary cable holder 53 is located at one end of the junction housing 36 and the secondary cable holder 54 is located at an opposite end of the junction housing 36 with at a predetermined distance therebetween for retaining the intermediate section of the electrical main shift control cable 31 on the junction housing 36. Also the cable engagement projection 55 is disposed between the primary cable holder 53 and the secondary cable holders 54 such that the lengths of the cable paths can be selectively changed to retain different lengths (selected amount) of the intermediate section of the electrical main shift control cable 31 to the junction housing 36 as seen in FIGS. 14 to 26.

Figure 19:
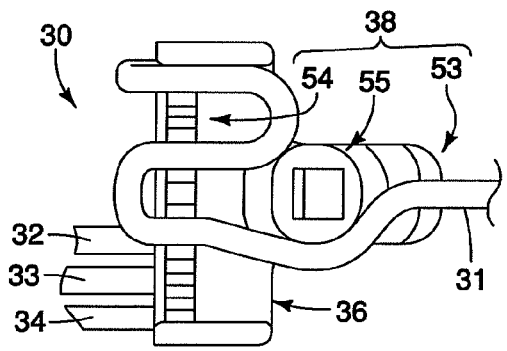
FIG. 19 is a top plan view of the bicycle electrical wiring unit illustrated in FIGS. 6 to 10 with the main shift control cable retained in a sixth position.
Figure 20:
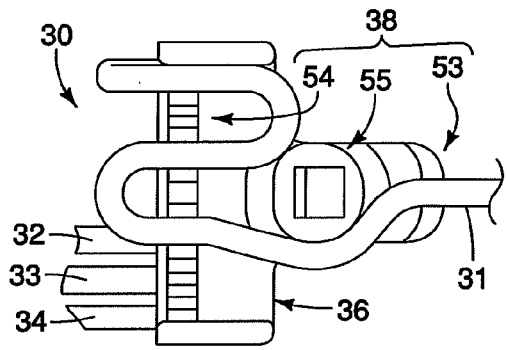
FIG. 20 is a top plan view of the bicycle electrical wiring unit illustrated in FIGS. 6 to 10 with the main shift control cable retained in a seventh position.
Figure 21:
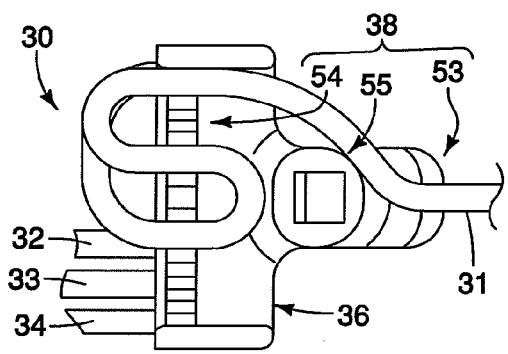
FIG. 21 is a top plan view of the bicycle electrical wiring unit illustrated in FIGS. 6 to 10 with the main shift control cable retained in an eighth position.
Figure 22:
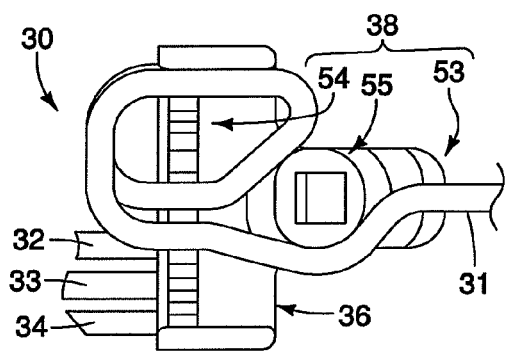
FIG. 22 is a top plan view of the bicycle electrical wiring unit illustrated in FIGS. 6 to 10 with the main shift control cable retained in a ninth position.
Figure 23:
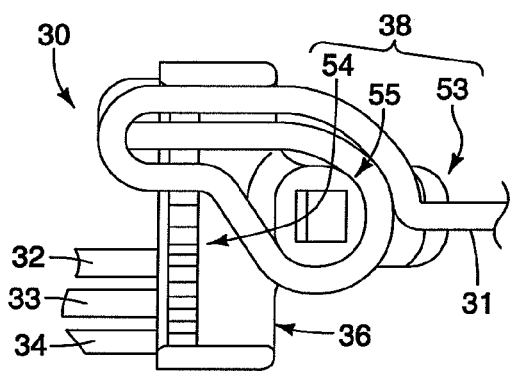
FIG. 23 is a top plan view of the bicycle electrical wiring unit illustrated in FIGS. 6 to 10 with the main shift control cable retained in a tenth position.
Figure 24:
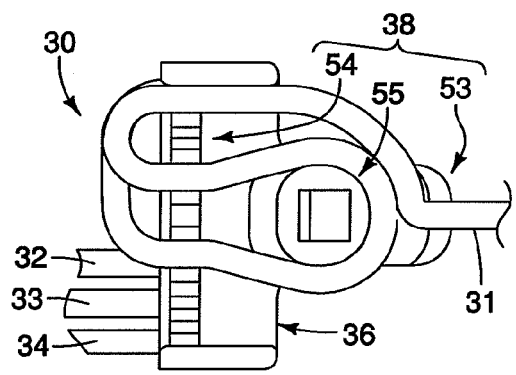
FIG. 24 is a top plan view of the bicycle electrical wiring unit illustrated in FIGS. 6 to 10 with the main shift control cable retained in an eleventh position.
Figure 25:
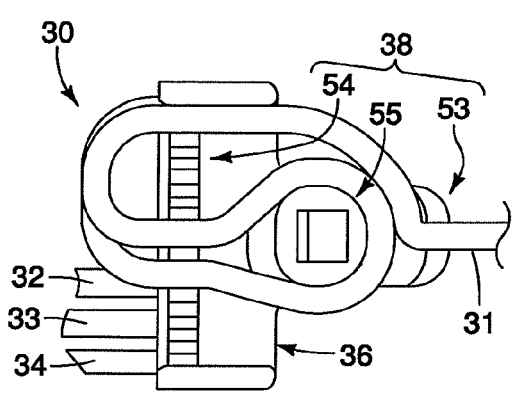
FIG. 25 is a top plan view of the bicycle electrical wiring unit illustrated in FIGS. 6 to 10 with the main shift control cable retained in a twelfth position.
Figure 26:
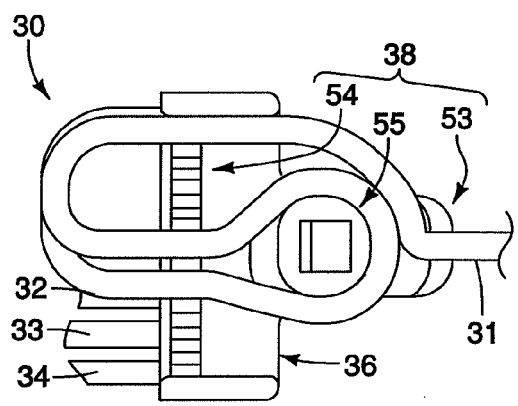
FIG. 26 is a top plan view of the bicycle electrical wiring unit illustrated in FIGS. 6 to 10 with the main shift control cable retained in a thirteenth position.

In FIG. 14, approximately 60 millimeters of the intermediate section of the electrical main shift control cable 31 is disposed between the point that the electrical main shift control cable 31 exits from the end cap 39 and the point of entering the primary cable holder 53. In FIG. 15, approximately 70 millimeters of the intermediate section of the electrical main shift control cable 31 is disposed between the point that the electrical main shift control cable 31 exits from the end cap 39 and the point of entering the primary cable holder 53. In FIG. 16, approximately 80 millimeters of the intermediate section of the electrical main shift control cable 31 is disposed between the point that the electrical main shift control cable 31 exits from the end cap 39 and the point of entering the primary cable holder 53. In FIG. 17, approximately 90 millimeters of the intermediate section of the electrical main shift control cable 31 is disposed between the point that the electrical main shift control cable 31 exits from the end cap 39 and the point of entering the primary cable holder 53. In FIG. 18, approximately 100 millimeters of the intermediate section of the electrical main shift control cable 31 is disposed between the point that the electrical main shift control cable 31 exits from the end cap 39 and the point of entering the primary cable holder 53. In FIG. 19, approximately 110 millimeters of the intermediate section of the electrical main shift control cable 31 is disposed between the point that the electrical main shift control cable 31 exits from the end cap 39 and the point of entering the primary cable holder 53. In FIG. 20, approximately 120 millimeters of the intermediate section of the electrical main shift control cable 31 is disposed between the point that the electrical main shift control cable 31 exits from the end cap 39 and the point of entering the primary cable holder 53. In FIG. 21, approximately 130 millimeters of the intermediate section of the electrical main shift control cable 31 is disposed between the point that the electrical main shift control cable 31 exits from the end cap 39 and the point of entering the primary cable holder 53. In FIG. 22, approximately 140 millimeters of the intermediate section of the electrical main shift control cable 31 is disposed between the point that the electrical main shift control cable 31 exits from the end cap 39 and the point of entering the primary cable holder 53. In FIG. 23, approximately 150 millimeters of the intermediate section of the electrical main shift control cable 31 is disposed between the point that the electrical main shift control cable 31 exits from the end cap 39 and the point of entering the primary cable holder 53. In FIG. 24, approximately 160 millimeters of the intermediate section of the electrical main shift control cable 31 is disposed between the point that the electrical main shift control cable 31 exits from the end cap 39 and the point of entering the primary cable holder 53. In FIG. 25, approximately 170 millimeters of the intermediate section of the electrical main shift control cable 31 is disposed between the point that the electrical main shift control cable 31 exits from the end cap 39 and the point of entering the primary cable holder 53. In FIG. 26, approximately 180 millimeters of the intermediate section of the electrical main shift control cable 31 is disposed between the point that the electrical main shift control cable 31 exits from the end cap 39 and the point of entering the primary cable holder 53. Thus, depending on the selected cable path, the selected amount of the intermediate section of the electrical main shift control cable 31 retained on the junction housing 36 can range between 60 millimeters to 180 millimeters, with ten millimeters increments between each of the different cable paths.

In the illustrated embodiment, the primary cable holder 53 and the secondary cable holders 54 are arranged on a bicycle frame mounting side of the junction housing 36. With this configuration, the electrical main shift control cable 31 is sandwiched (trapped) between the bottom bracket tube of the bicycle frame 14 and the junction housing 36 to prevent the electrical main shift control cable 31 from being disengaged from the primary cable holder 53 and the secondary cable holders 54 when the electrical wiring unit 30 is mounted to the bottom bracket tube of the bicycle frame 14. In other words, since the cable retaining slots 53a and 54a have cable receiving openings facing outwardly with respect to the bicycle frame mounting side of the junction housing 36, the bottom bracket tube of the bicycle frame 14 covers the cable receiving openings of the cable retaining slots 53a and 54a when the electrical wiring unit 30 is mounted to the bottom bracket tube of the bicycle frame 14. Preferably, the primary cable holder 53 includes a curved mounting surface 53b facing outwardly with respect to the bicycle frame mounting side of the junction housing 36. Likewise, the secondary cable holders 54 includes a curved mounting surface 54b facing outwardly with respect to the bicycle frame mounting side of the junction housing 36 and the cable engagement projection 55 includes a curved mounting surface 55b facing outwardly with respect to the bicycle frame mounting side of the junction housing 36. These curved mounting surfaces 53b, 54b and 55b form an overall curved mounting surface of the junction housing 36 with their curvatures matching the exterior curvature of the bottom bracket tube of the bicycle frame 14.

Figure 27:
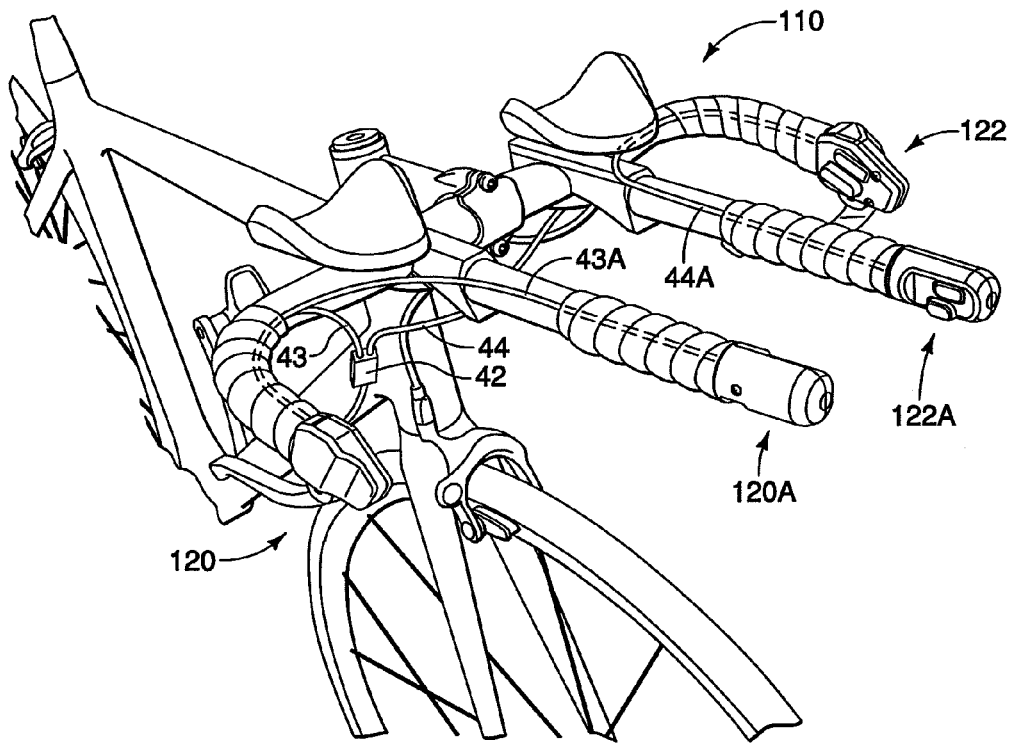
FIG. 27 is a partial perspective view of a bicycle having an electrically controlled shifting system in which a bicycle electric wiring harness including a bicycle electrical wiring unit is mounted to a bicycle frame in accordance with another preferred embodiment.
Figure 28:
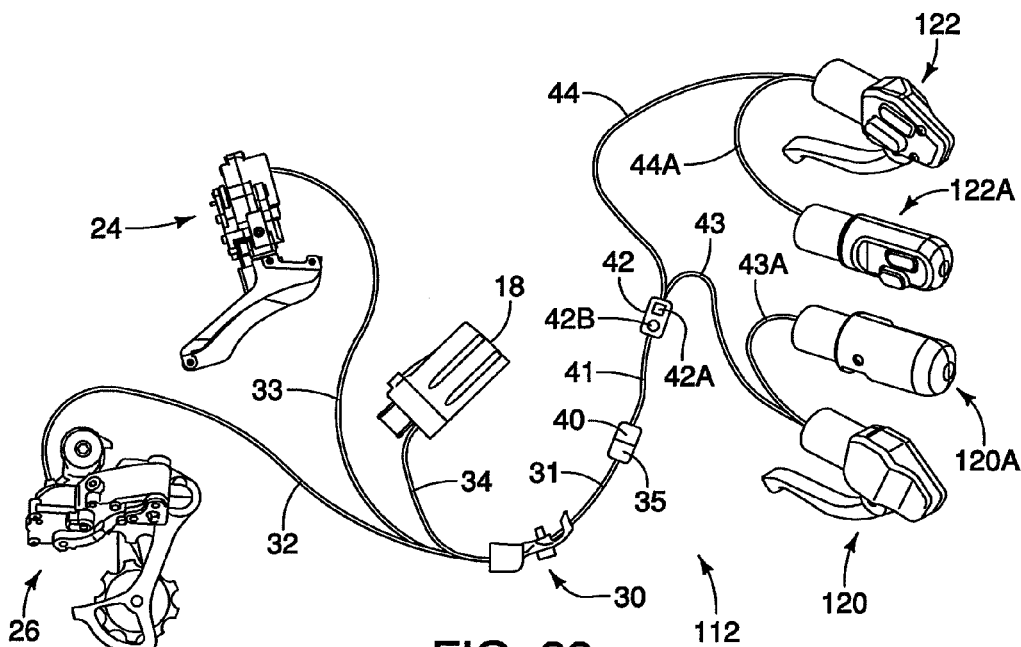
FIG. 28 is a simplified side elevational view of the bicycle electric wiring harness coupled to the components of the electrically controlled shifting system illustrated in FIG. 27.

Referring now to FIGS. 27 and 28, a bicycle electric wiring harness 112 is used with a bicycle 110 that includes a pair of main bar end electric shifters 120 and 122 coupled to free ends of a bull horn handlebar and a pair of additional bar end electric shifters 120A and 122A mounted to the free ends of a pair of additional attachment bars. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In this embodiment, the electrical shift cables 43 and 44 are electrical connected to the electric shifters 120 and 122 with the electrical conductors connected as shown in FIG. 5 of the first embodiment. However, the bicycle electric wiring harness 112 of this embodiment has two supplemental electrical shift cables 43A and 44A, which are electrically attached to the additional bar end electric shifters 120A and 122A.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle electrical wiring unit comprising:
   a junction housing including a bicycle frame mounting side that faces a bicycle frame when the bicycle electrical wiring unit is installed on the bicycle frame, the junction housing further including a fastener hole arranged to receive a bolt to detachably secure the wiring unit to a bottom bracket tube of the bicycle frame;
   at least a first electrical bicycle component cable, a second electrical bicycle component cable, and a third electrical bicycle component cable;
   an electrical wiring junction mounted to the junction housing that electrically connects the first, second and third electrical bicycle component cables to each other through the electrical wiring junction, the first, second, and third electrical bicycle component cables connecting to each other inside the junction housing, with the first electrical bicycle component cable entering the junction housing at a first location and the second electrical bicycle component cable entering the junction housing at a second location that is spaced from the first location; and
   a cable winding structure disposed on the bicycle frame mounting side of the junction housing, the cable winding structure including at least one electrical cable holder for selectively retaining different lengths of an intermediate section of the first electrical bicycle component cable to the junction housing.

2. The bicycle electrical wiring unit according to claim 1, further comprising an end cap disposed on the junction housing with the end cap including at least one cable opening for receiving an end section of the first electrical bicycle component cable.

3. The bicycle electrical wiring unit according to claim 2, wherein
the junction housing includes a housing recess with the wiring junction disposed in the housing recess and the end cap at least partially closes the housing recess.

4. The bicycle electrical wiring unit according to claim 1, wherein
the junction housing and the cable winding structure are integrally formed together as a one-piece, unitary member.

5. The bicycle electrical wiring unit according to claim 1, wherein
the at least one electrical cable holder includes a primary cable holder located at one end of the junction housing and a secondary cable holder located at an opposite end of the junction housing at a predetermined distance for retaining the intermediate section of the first electrical bicycle component cable.

6. The bicycle electrical wiring unit according to claim 5, wherein
the secondary cable holder includes a retaining slot with a cable receiving opening facing outwardly with respect to the bicycle frame mounting side of the junction housing.

7. The bicycle electrical wiring unit according to claim 6, wherein
the primary cable holder includes a cable retaining slot with a cable receiving opening facing outwardly with respect to the bicycle frame mounting side of the junction housing.

8. The bicycle electrical wiring unit according to claim 1, wherein
the bicycle frame mounting side of the junction housing includes a curved mounting surface having the fastener hole.

9. The bicycle electrical wiring unit according to claim 1, wherein
the at least one electrical cable holder has a plurality of cable retaining slots arranged side by side for retaining different portions of the intermediate section of the first electrical bicycle component cable in a parallel relationship, with the cable retaining slots having open ends facing away from the junction housing.

10. A bicycle electrical wiring unit comprising:
a junction housing including a bicycle frame mounting side that faces a bicycle frame when the bicycle electrical wiring unit is installed on the bicycle frame, the junction housing further including a fastener hole arranged to receive a bolt to detachably secure the wiring unit to a bottom bracket tube of the bicycle frame;
a wiring junction mounted to the junction housing for electrically connecting at least first, second and third electrical bicycle component cables to each other; and
a cable winding structure disposed on the bicycle frame mounting side of the junction housing, the cable winding structure including at least one electrical cable holder for selectively retaining different lengths of an intermediate section of a first electrical bicycle component cable of the electrical bicycle component cables to the junction housing,
the at least one electrical cable holder including a primary cable holder located at one end of the junction housing for retaining the intermediate section of the first electrical bicycle component cable and a plurality of secondary cable holders located at an opposite end of the junction housing that is spaced apart at a predetermined distance from the primary cable holder for retaining the intermediate section of the third electrical bicycle component cable.

11. The bicycle electrical wiring unit according to claim 10, wherein
the secondary cable holders include a plurality of cable retaining slots.

12. The bicycle electrical wiring unit according to claim 11, wherein
the primary cable holder includes a cable retaining slot.

13. A bicycle electrical wiring unit comprising:
a junction housing including a bicycle frame mounting side that faces a bicycle frame when the bicycle electrical wiring unit is installed on the bicycle frame, the junction housing further including a fastener hole arranged to receive a bolt to detachably secure the wiring unit to a bottom bracket tube of the bicycle frame;
at least a first electrical bicycle component cable, a second electrical bicycle component cable, and a third electrical bicycle component cable;
an electrical wiring junction mounted to the junction housing that electrically connects the first, second and third electrical bicycle component cables to each other through the electrical wiring junction, the first, second and third electrical bicycle component cables connecting to each other inside the junction housing, with the first electrical bicycle component cable entering the junction housing at a first location and the second electrical bicycle component cable entering the junction housing at a second location that is spaced from the first location; and
a cable winding structure disposed on the bicycle frame mounting side of the junction housing, the cable winding structure including at least one electrical cable holder for providing different cable paths of an intermediate section of the first electrical bicycle component cable.

14. The bicycle electrical wiring unit according to claim 13, wherein
the at least one electrical cable holder includes a primary cable holder located at one end of the junction housing and a secondary cable holder located at an opposite end of the junction housing at a predetermined distance for retaining the intermediate section of the first electrical bicycle component cable.

15. The bicycle electrical wiring unit according to claim 14, wherein
the at least one electrical cable holder includes a plurality of the secondary cable holders at the opposite end of the junction housing that is spaced apart from the primary cable holder.

16. The bicycle electrical wiring unit according to claim 13, wherein
the at least one electrical cable holder has a plurality of cable retaining slots arranged side by side for retaining different portions of the intermediate section of the first electrical bicycle component cable in a parallel relationship, with the cable retaining slots having open ends facing away from the junction housing.

* * * * *